US007720902B2

(12) United States Patent
Hirairi

(10) Patent No.: US 7,720,902 B2
(45) Date of Patent: May 18, 2010

(54) METHODS AND APPARATUS FOR PROVIDING A REDUCTION ARRAY

(75) Inventor: Koji Hirairi, Texas (JP)

(73) Assignee: Sony Corporation Entertainment Inc., Tokyo (JP)

( * ) Notice: Subject to any disclaimer, the term of this patent is extended or adjusted under 35 U.S.C. 154(b) by 937 days.

(21) Appl. No.: 11/509,532

(22) Filed: Aug. 24, 2006

(65) Prior Publication Data

US 2007/0244943 A1 Oct. 18, 2007

Related U.S. Application Data

(60) Provisional application No. 60/777,587, filed on Feb. 28, 2006.

(51) Int. Cl.
*G06F 7/50* (2006.01)

(52) U.S. Cl. ........................................ 708/708

(58) Field of Classification Search ................ 708/708, 708/629

See application file for complete search history.

(56) References Cited

U.S. PATENT DOCUMENTS 6,578,063 B1 * 6/2003 Kojima et al. ............... 708/708
6,622,154 B1 9/2003 Hayashi et al.
6,877,022 B1 4/2005 Toyonoh et al.
7,035,893 B2 * 4/2006 Awaka et al. ............... 708/702
2001/0016865 A1 * 8/2001 Goto .......................... 708/708
2002/0129077 A1 * 9/2002 Rhee .......................... 708/708

OTHER PUBLICATIONS

Ercegovac et al.; "Digital Arithmetic;" published 2004 by Elsevier Science (USA); pp. 139-151, 197-205.
Tadayoshi Enomoto; "CMOS VLSI Circuits;" published Oct. 30, 1996 by Baihu-kan; p. 161.

* cited by examiner

*Primary Examiner*—Tan V Mai
(74) *Attorney, Agent, or Firm*—Matthew B. Dernier, Esq.; Gibson & Dernier LLP

(57) ABSTRACT

Methods and apparatus provide for accumulating bit streams from four partial products and producing a carry-save output pair, including: producing the save, S, portion of the carry-save output pair, in accordance with the following Boolean expression: S=d3 XOR ((d0 XOR d1) XOR (d2 XOR Cin)), wherein d0, d1, d2, d3 are the bit streams from the four partial products, and Cin is a carry in bit stream receivable from an adjacent compression circuit of an overall partial product reduction array.

6 Claims, 6 Drawing Sheets

120

| x | y | z | C | S |
|---|---|---|---|---|
| 0 | 0 | 0 | 0 | 0 |
| 0 | 0 | 1 | 0 | 1 |
| 0 | 1 | 0 | 0 | 1 |
| 0 | 1 | 1 | 1 | 0 |
| 1 | 0 | 0 | 0 | 1 |
| 1 | 0 | 1 | 1 | 0 |
| 1 | 1 | 0 | 1 | 0 |
| 1 | 1 | 1 | 1 | 1 |

METHODS AND APPARATUS FOR PROVIDING A REDUCTION ARRAY

CROSS REFERENCE TO RELATED APPLICATION

This application claims the benefit of U.S. Provisional Patent Application No: 60/777,587, filed Feb. 28, 2006, entitled "Methods And Apparatus For Providing A Reduction Array," the entire disclosure of which is hereby incorporated by reference.

BACKGROUND OF THE INVENTION

The present invention relates to methods and apparatus for combining partial products produced by, for example, a Booth multiplier or array multiplier.

Many of the processes performed by information handling systems and the like involve the multiplication of binary numbers. In a multiplication function, there exists a multiplicand and a multiplier. As is well known in the art, binary numbers are multiplied through a process of multiplying the multiplicand by the first bit of the multiplier. Next, the multiplicand is multiplied by the second bit of the multiplier, shifting the result one digit and adding the products. This process is continued until each bit of the multiplier has been multiplied by the multiplicand.

Each of the products produced by multiplying the multiplicand by a bit of the multiplier produces a number which is referred to as a partial product. The partial products generated during the multiplication of the multiplier binary number and the multiplicand binary number may be produced using, for example, a Booth encoding algorithm, an array multiplier, or the like. The resulting product is formed by accumulating the partial products propagating the carries from the rightmost columns to the left. This process is referred to as partial product accumulation.

Conventional approaches for aggregating or accumulating partial products may require a significant number of cycles. As the addition of two N-bit binary numbers is proportional to $O(\log_2(N))$, simple addition is not a preferred technique to obtain the summation. There are numerous Carry-Save addition techniques in existence in the prior art to perform the summation of the partial products of a multiplication process. These Carry-Save addition techniques involve the conversion of 3-bit numbers to 2-bit numbers represented by C (carry) and S (sum). This conversion is sometimes referred to as 3 to 2 compression. The 3 to 2 compressors may be cascaded to obtain higher order compressors, such as 4 to 2 compressors. 3 to 2 compressors and 4 to 2 compressors may in turn be cascaded to obtain even higher order compressors, which are called reduction arrays.

It has been discovered that the propagation delay through a reduction array may significantly impact the throughput of a processing system, particularly where there are a large number of partial products to be computed. Thus, a need has now been identified for a reduction array technique that enjoys a lower propagation delay as compared with conventional implementations.

SUMMARY OF THE INVENTION

In accordance with one or more embodiments of the present invention, methods and apparatus according to the present invention may provide for: accumulating bit streams from four partial products and producing a carry-save output pair. The methods and apparatus further provide for: producing the save, S, portion of the carry-save output pair, in accordance with the following Boolean expression:

S=d3XOR ((d0XOR d1) XOR (d2XOR Cin)), wherein d0, d1, d2, d3 are the bit streams from the four partial products, and Cin is a carry in bit stream receivable from an adjacent compression circuit of an overall partial product reduction array.

The methods and apparatus further provide for: producing the carry, C, portion of the carry-save output pair, such that:

C=di or Cin, when (d0 XOR d1) XOR (d2 XOR Cin) is true; and

C=d3, when (d0 XOR d1) XOR (d2 XOR Cin) is false, where di is d0, d1, d2, or d3.

The methods and apparatus further provide for: producing a carry output, Cout, for receipt by an adjacent compression circuit of an overall partial product reduction array, wherein Cout may be expressed in accordance with the following formula: Cout=d0·d1+d1·d2+d0·d3.

The methods and apparatus further provide for a reduction array for accumulating partial products, comprising: a 3 to 2 compression circuit operable to receive bit streams from a trio of partial products and produce a first carry-save output pair, C1, S1; a first 4 to 2 compression circuit operable to receive bit streams from a first quartet of partial products and produce a second carry-save output pair, C2, S2; and a second 4 to 2 compression circuit operable to receive bit streams from a second quartet of partial products and produce a third carry-save output pair, C3, S3, wherein the C1 output of the 3 to 2 compression circuit is coupled as one of the partial product inputs to the first 4 to 2 compression circuit, and the S1 output of the 3 to 2 compression circuit is coupled as one of the partial product inputs to the second 4 to 2 compression circuit.

Other aspects, features, and advantages of the present invention will be apparent to one skilled in the art from the description herein taken in conjunction with the accompanying drawings.

DESCRIPTION OF THE DRAWINGS

For the purposes of illustration, there are forms shown in the drawings that are presently preferred, it being understood, however, that the invention is not limited to the precise arrangements and instrumentalities shown.

DETAILED DESCRIPTION OF THE PREFERRED EMBODIMENTS

Figure 1:
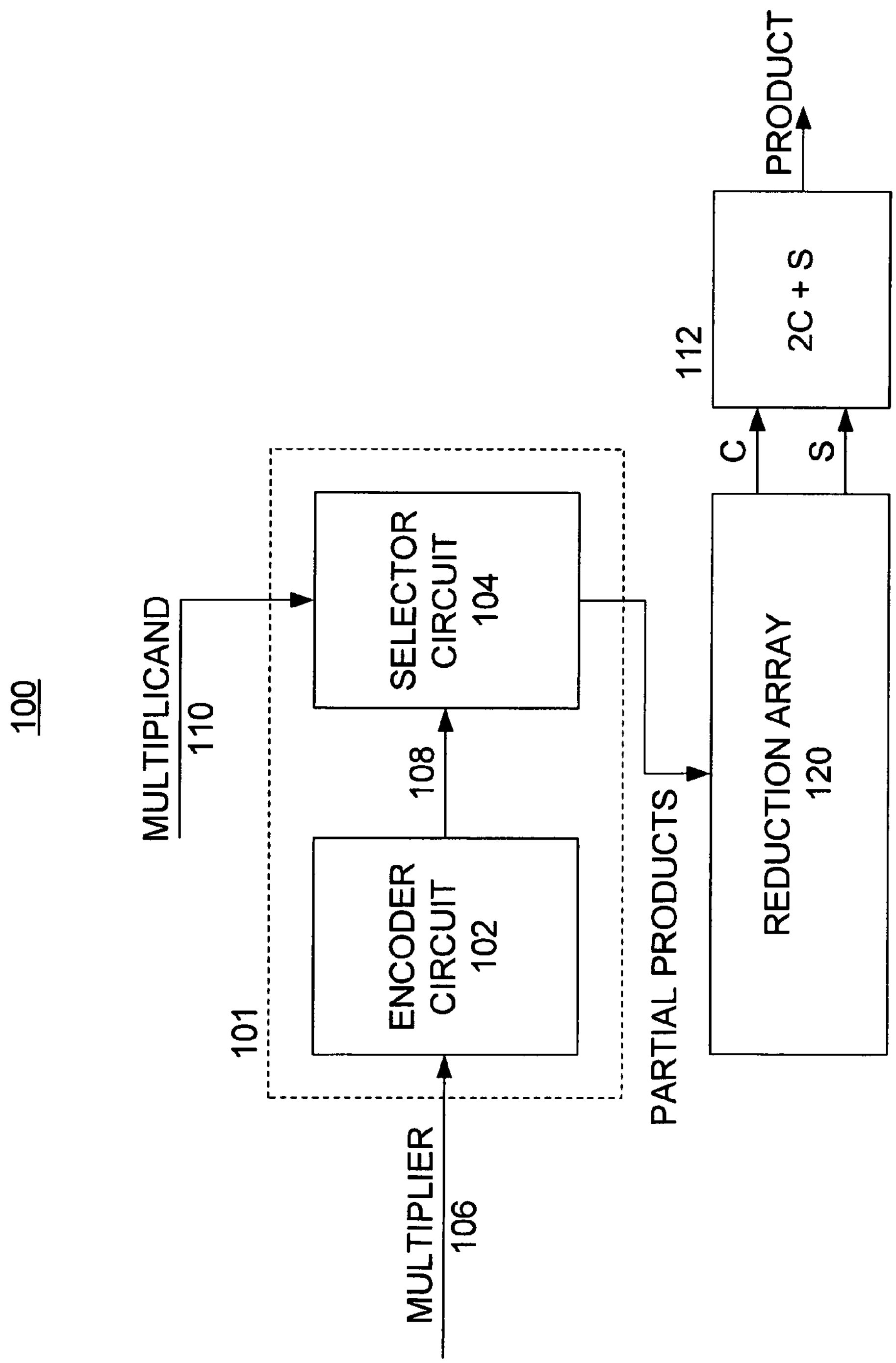
FIG. 1 is a block diagram of a multiplier and reduction array circuit operable to produce partial products and combine same in connection with the multiplication of two binary numbers in accordance with one or more embodiments of the present invention.

With reference to the drawings, wherein like numerals indicate like elements, there is shown in FIG. 1 a block diagram of a multiplier circuit 100 operable to produce and accumulate partial products to produce the product of two binary numbers in accordance with one or more embodiments of the present invention. The circuit 100 includes a partial product circuit 101, which in one or more embodiments includes an encoder circuit 102 and a selector circuit 104, and a reduction array circuit 120. Those skilled in the art will appreciate from the description herein that different implementations of the partial product circuit 101 may be employed depending on the design criteria of the system 100. For example, any of the known or hereinafter developed Booth algorithms or array multipliers may be employed to implement the partial product circuit 101.

In a preferred embodiment, the encoder circuit 102 converts respective groups of bits of a multiplier 106 (a radix 2 binary number) to respective groups of encoded bits on lines 108 representing radix 4 numbers. Booth encoding algorithms may recode a radix-2 multiplier into a radix-4 multiplier with an encoded digital set, {−2, −1, 0, 1, 2}, such that the number of partial products may be reduced by one half. The selector circuit 104 is preferably operable to receive the respective groups of encoded bits on lines 108 and to receive a group of bits of the multiplicand 110 in order to produce a respective bit of a partial product of the multiplier and the multiplicand. In a preferred embodiment, the selector circuit 104 operates as a multiplexer, where each selector operation receives a respective group of radix 2 bits of the multiplicand 110 and the groups of radix 2 bits of the multiplier 106 are used as selector bits. The aggregate of the outputs from the selector operations for a given group of radix 2 bits of the multiplier 106 results in a partial product.

The multiplier circuit 100 may also include a final circuit 112 that is operable to receive the carry and save outputs from the reduction array 120 and produce the final product of the multiplier 106 and multiplicand 110. In accordance with carry-save addition techniques, the final circuit 112 preferably operates to perform the arithmetic function of 2C+S upon the carry and save outputs in order to produce the final product.

Figure 2:
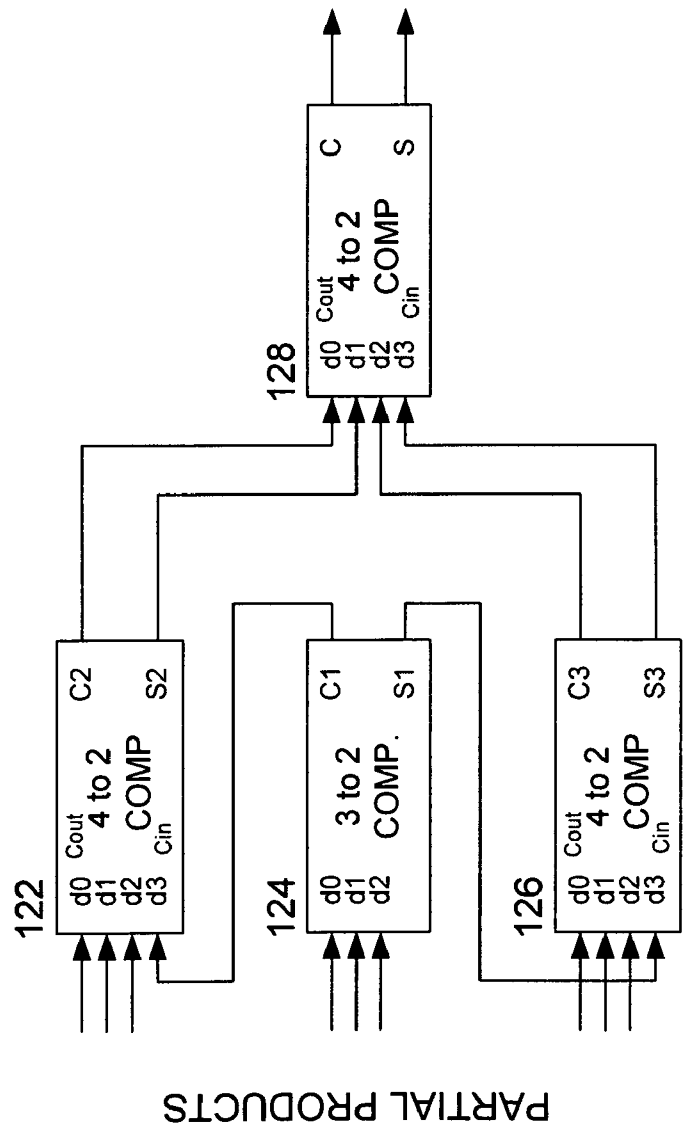
FIG. 2 is a more detailed block diagram suitable for implementing the reduction array circuit of FIG. 1.

Reference is now made to FIG. 2, which is a more detailed block diagram suitable for implementing the reduction array 120 of FIG. 1. The reduction array 120 may include a plurality of compression circuits 122, 124, 126, 128, etc. Each compression circuit is operable to receive a plurality of bit streams from a number of partial products that were produced by the partial product circuit 101 and to output respective carry-save outputs. Respective ones of the compression circuits 122, 124, 126 that are positioned early in the array 120 produce intermediate carry-save outputs, while a final compression circuit, e.g., compression circuit 128, may produce a final carry-save output.

In a preferred configuration, the 3 to 2 compression circuit 124 is preferably operable to receive bit streams from a trio of partial products and to produce a first carry-save output pair, C1, S1. The terminal notations on the 3 to 2 compression circuit 124 into which the trio of partial products is received are d0, d1, and d2.

A first 4 to 2 compression circuit 122 is preferably operable to receive bit streams from a first quartet of partial products and to produce a second carry-save output pair, C2, S2. While the terminal designations for receiving the quartet of partial products are labels d0, d1, d2, and d3, in accordance with one or more aspects of the present invention, the d3 input does not receive a bit stream of a partial product, per say. Rather, the d3 input is operable to receive the carry C1 output of the 3 to 2 compression circuit 124. The reduction array 120 preferably also includes a second 4 to 2 compression circuit 126 that is operable to receive bit streams from a second quartet of partial products and to produce a third carry-save output pair C3, S3. As with the first 4 to 2 compression circuit 122, the second 4 to 2 compression circuit 126 does not receive a bit stream of partial products into its d3 input; rather, the d3 input preferably receives the save output S1 from the 3 to 2 compression circuit 124.

As will be discussed later in this specification, this embodiment of the reduction array 120 advantageously provides faster propagation of the signaling through the respective compression circuits, thereby improving the throughput of the multiplier circuit 100.

Figures 3, 4:
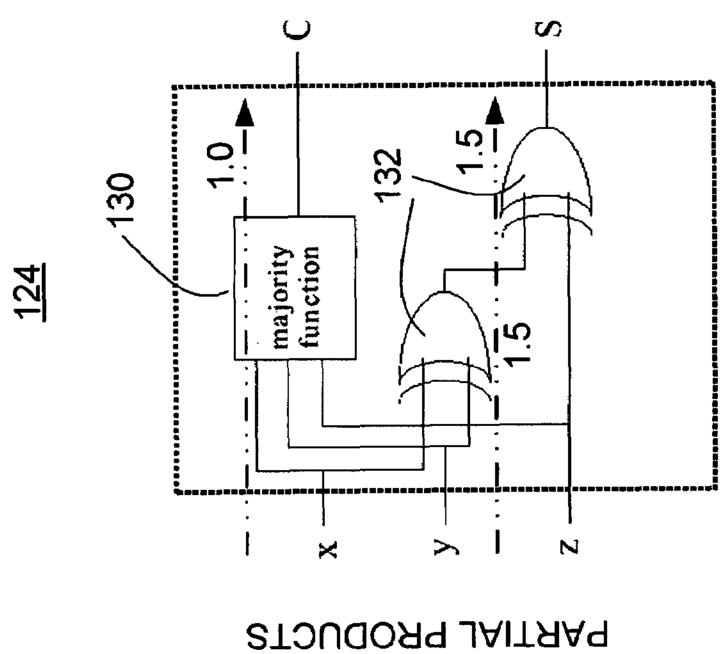
FIG. 3 is a detailed circuit diagram suitable for implementing one or more of the compression circuits of the reduction array circuit of FIG. 2.
FIG. 4 is a truth table illustrating the operation of the compression circuit of FIG. 3.

Reference is now made to FIG. 3, which is a detailed circuit diagram suitable for implementing the 3 to 2 compression circuit 124 of FIG. 2. Those skilled in the art will appreciate that the detailed circuit configuration illustrated in FIG. 3 is provided by way of example only and that the invention contemplates that any of the known or hereafter developed 3 to 2 compression circuits may be employed without departing from the spirit and scope of the present invention. The overall functionality of the 3 to 2 compression circuit 124 is also illustrated in FIG. 4, which is a truth table showing the relationship between the inputs x, y, z to the circuit and the carry-save outputs. Analysis of the truth table reveals that the digital logic of the 3 to 2 compression circuit 124 adheres to the following formula: x+y+z=2C+S. Thus, for example, when the x, y, z inputs to the 3 to 2 compression circuit 124 are 1, 1, 1, the 3 to 2 compression circuit 124 is operable to produce C and S such that 2C+S=3. Thus, C=1 and S=1. Similar analysis may be carried out on other x, y, z combinations.

Turning to the specific circuit implementation illustrated in FIG. 3, the 3 to 2 compression circuit 124 preferably includes a majority function circuit 130 and a plurality of digital logic gates 132 operable to carry out specific combinational logic functions in order to produce the respective carry-save output. In particular, the majority function circuit 130 is preferably operable to produce the carry output C, where C may be expressed in accordance with the following formula. $C=x\cdot y+y\cdot z+x\cdot z$. The logic gates 132 are preferably operable to produce the save output S in accordance with the following Boolean expression: S=z XOR (x XOR y). Notably, the signal propagation delay through the majority function circuit 130 may be characterized as 1.0, while the propagation delay of a signal through the logic gates 132 may be characterized by 1.5+1.5=3.0. These propagation delays will be discussed in more detail later in this specification when propagation delays through the reduction array 120 are considered.

Figure 5:
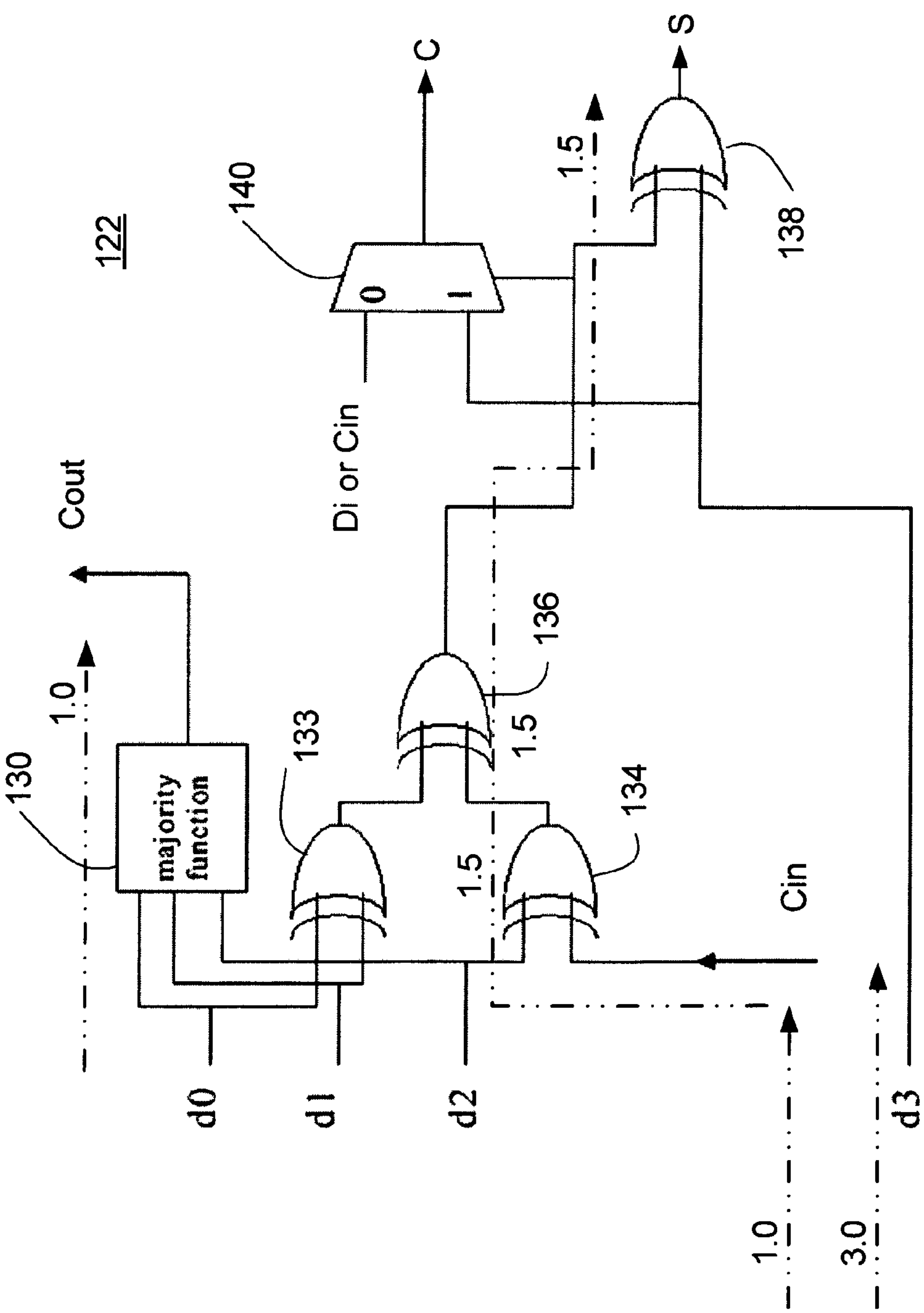
FIG. 5 is a detailed circuit diagram of circuit suitable for implementing one or more of the 4 to 2 compression circuits of FIG. 2.

Reference is now made to FIG. 5, which is a detailed circuit diagram of a circuit suitable for implementing one or more of the 4 to 2 compression circuits 122, 126, 128 of FIG. 2. For purposes of discussion, it is assumed that the circuit of FIG. 5 represents the detailed logic of the 4 to 2 compression circuit 122. The 4 to 2 compression circuit 122 preferably includes a majority function circuit 130, a plurality of logic gates 133, 134, 136, 138, and a multiplexer circuit 140. The majority function circuit 130 is preferably operable to function in a substantially similar way to that discussed hereinabove with respect to FIG. 3. In particular, the majority function circuit 130 is preferably operable to produce a carry output Cout for receipt by an adjacent compression circuit within the reduction array 120. The carry output may therefore be expressed in accordance with the following formula:

$$Cout=d0.d1=d1.d2+d0.d2$$

The plurality of logic gates 133, 134, 136, and 138 are preferably coupled such that the output of logic gate 138 produces the save output S, in accordance with the following Boolean expression:

S=d3XOR ((d0XOR d1XOR (d2XOR Cin)), where Cin is a carry in bit stream receivable from an adjacent compression circuit of the reduction array 120.

The output of the multiplexer circuit 140 is preferably taken to be the carry output C, where the multiplexer 140 is controlled utilizing the output of the logic gate 136. The inputs to the multiplexer 140 include di or Cin, on the one hand, and d3 on the other hand. The reference designator di is intended to identify any of the partial product inputs to the 4 to 2 compression circuit 122, i.e., d0, d1, d2, or d3. The signal at the output of logic gate 136 may be expressed by the following Boolean formula: (d0 XOR d1) XOR (d2 XOR Cin). The output of the multiplexer circuit 140 is preferably C=di or Cin, when the output of logic gate 136 is true (e.g., logic high). Conversely, the output of the multiplexer circuit 140 is preferably C=d3, when the output of the logic gate 136 is false (e.g., logic low).

Reference is now made to FIGS. 2 and 5, where certain propagation delays will be discussed. In particular, the propagation delay through the majority function circuit 130, as discussed above, may be represented by 1.0. The propagation delay from the d0, d1, or d2 inputs to the save output S may be expressed by a 1.5 propagation delay associated with each logic gate 133, 134, 136, and 138. The total propagation delay from any of the d0, d1, or d2 inputs to the save output S is 4.5. Thus, the worst case propagation delay through the 4 to 2 compression circuit 122 may be established by assigning a propagation delay from a partial product input of an adjacent compression circuit that provides an input to the Cin input to the 4 to 2 compression circuit 122. In accordance with one or more embodiments of the present invention, a Cout signal from an adjacent compression circuit, such as a 4 to 2 compression circuit, will be utilized to provide a signal into the Cin input of the 4 to 2 compression circuit 122. As discussed above, the propagation delay from a partial product input to the majority function circuit 130 to the Cout signal line may be expressed as 1.0. Assigning that propagation delay to the signal input to the Cin line of the 4 to 2 compression circuit 122, the overall delay through the 4 to 2 compression circuit 122 is 5.5 units. All other paths through the 4 to 2 compression circuit 122 are less than 5.5 units.

As will be discussed below, the propagation delay of 5.5 units through a respective stage of the reduction array circuit 120 compares favorably against related reduction array circuits.

Figure 6:
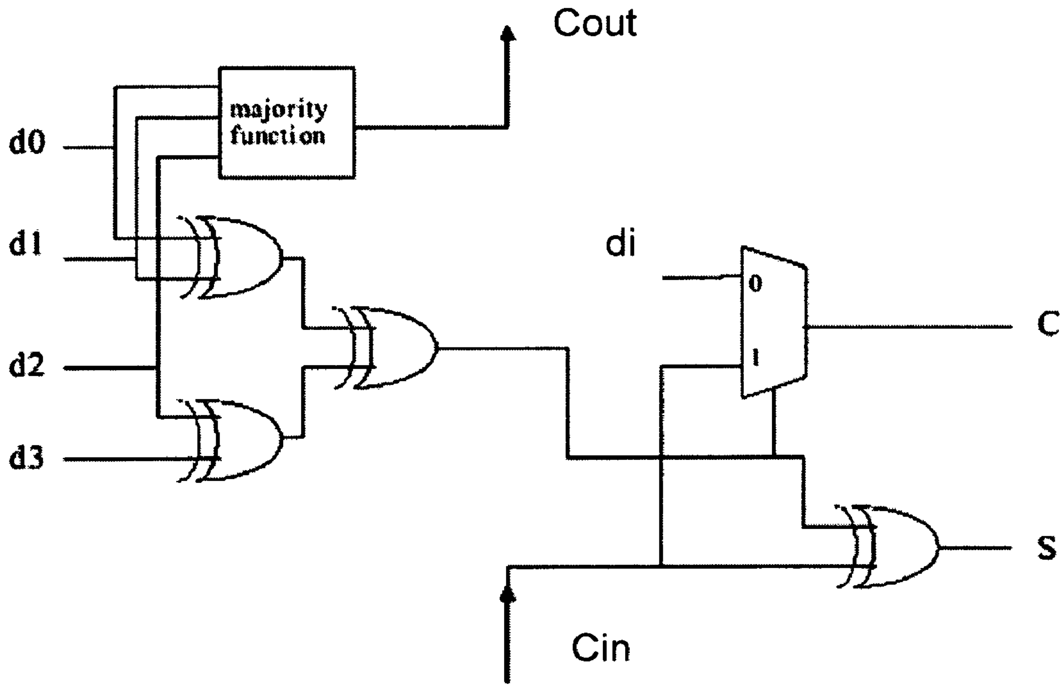
FIG. 6 is a detailed circuit diagrams of a 4 to 2 compression circuit of the prior art.

Reference is now made to FIG. 6, which illustrates a detailed circuit diagram of an existing 4 to 2 compression circuit. Although there are some circuit topology similarities between the 4 to 2 compression circuit of FIG. 6 and the 4 to 2 compression circuit 122 of FIG. 5, it is noted that the respective Boolean expressions for the carry-save outputs C, S of the 4 to 2 compression circuit of FIG. 6 are substantially different than those for the 4 to 2 compression circuit 122 of FIG. 5.

Figure 7:
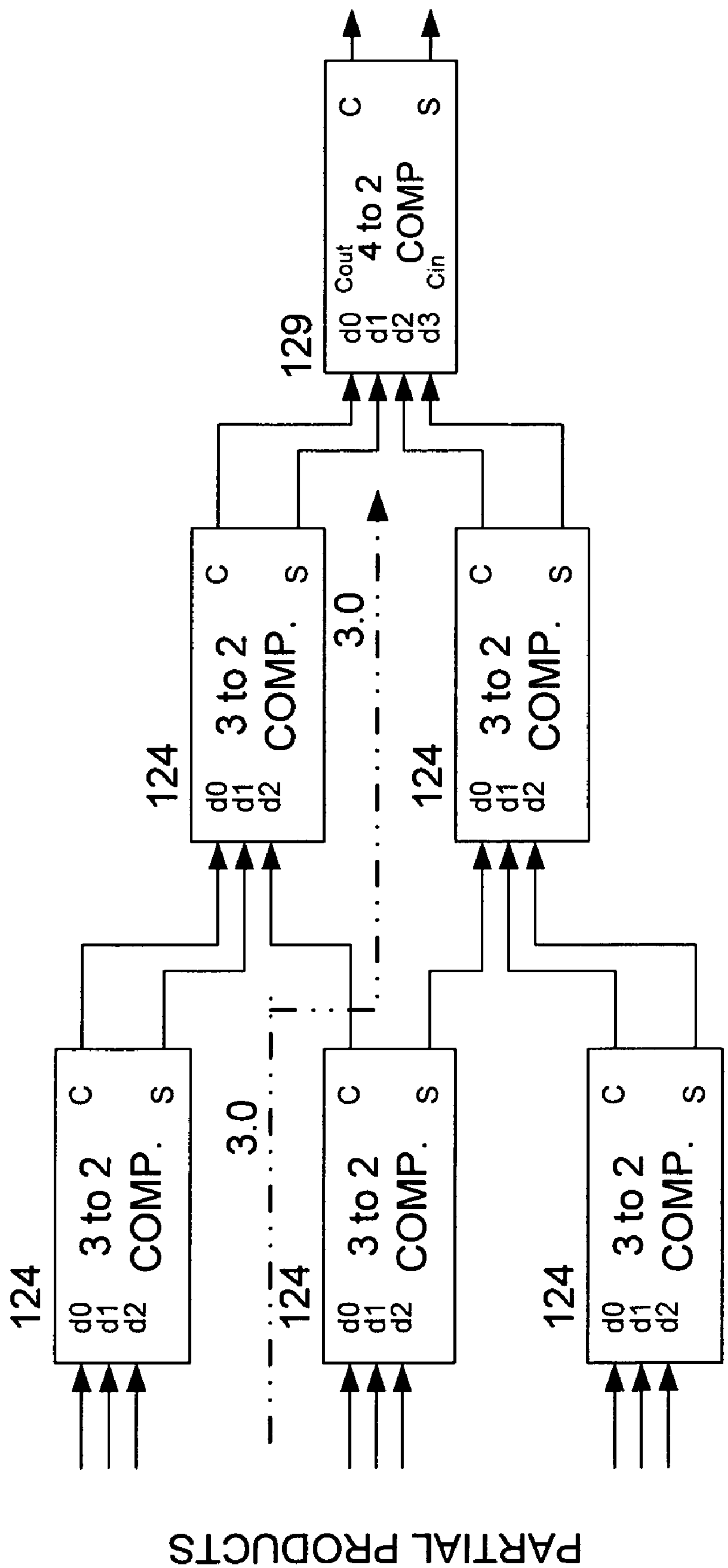
FIG. 7 is a block diagram of a reduction array circuit of the prior art.

With reference to FIG. 7, a plurality of 3 to 2 compression circuits 124 and a conventional 4 to 2 compression circuit 129 may be connected as shown to achieve a compression ratio substantially similar to that of FIG. 2. Recalling that the propagation delay through the logic gates 132 of the 3 to 2 compression circuit 124 (FIG. 3) is 3.0, the propagation delay from the partial products through two stages of the reduction array of FIG. 7 (up to the 4 to 2 compression circuit 129) is 6.0 units. Thus, the propagation delay through the reduction array circuit 120 discussed hereinabove of 5.5 units is a significant improvement over existing reduction array circuits. This provides a significant advantage in carrying out multiplication of the multiplier 106 and the multiplicand 110 in the multiplier circuit 100 of FIG. 1.

It is noted that the methods and apparatus described thus far and/or described later in this document may be achieved utilizing any of the known technologies, such as standard digital circuitry, analog circuitry, microprocessors, digital signal processors, any of the known processors that are operable to execute software and/or firmware programs, programmable digital devices or systems, programmable array logic devices, or any combination of the above, including devices now available and/or devices which are hereinafter developed.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A 4 to 2 compression circuit operable to receive bit streams from at least three partial products and produce a carry-save output pair, comprising:

a plurality of logic gates that are operable to produce the save, S, portion of the carry-save output pair, in accordance with the following Boolean expression:

S=d3XOR ((d0XORd1) XOR (d2XOR Cin)), wherein d0, d1, d2, d3 are the bit streams from the four partial products, and Cin is a carry in bit stream receivable from an adjacent compression circuit of an overall partial product reduction array.

2. The compression circuit of claim 1, further comprising: a multiplexer circuit operable to produce the carry, C, portion of the carry-save output pair, such that:

(i) C=di or Cin, when (d0 XOR d1) XOR (d2 XOR Cin) is true; and (ii) C=d3, when (d0 XOR d1) XOR (d2 XOR Cin) is false, where di is d0, d1, d2, or d3.

3. The compression circuit of claim 1, further comprising: a majority function circuit operable to produce a carry output, Cout, for receipt by an adjacent compression circuit of an overall partial product reduction array, wherein Cout may be expressed in accordance with the following formula:

$$Cout=d0.d1=d1.d2+d0.d2.$$

4. A method for accumulating bit streams from four partial products and producing a carry-save output pair, comprising:

producing the save, S, portion of the carry-save output pair, in accordance with the following Boolean expression:

S=d3XOR ((d0XOR d1) XOR (d2XOR Cin)), wherein d0, d1, d2, d3 are the bit streams from the four partial products, and Cin is a carry in bit stream receivable from an adjacent compression circuit of an overall partial product reduction array.

5. The method of claim 4, further comprising: producing the carry, C, portion of the carry-save output pair, such that:

(i) C=di or Cin, when (d0 XOR d1) XOR (d2 XOR Cin) is true; and (ii) C=d3, when (d0 XOR d1) XOR (d2 XOR Cin) is false, where di is d0, d1, d2, or d3.

6. The method of claim 4, further comprising: producing a carry output, Cout, for receipt by an adjacent compression circuit of an overall partial product reduction array, wherein Cout may be expressed in accordance with the following formula:

$$Cout=d0.d1=d1.d2+d0.d2.$$

* * * * *